July 5, 1955    R. RUEMELIN    2,712,425
HOSE SUPPORT FOR FUME AND DUST COLLECTORS
Filed Jan. 7, 1953    2 Sheets-Sheet 1
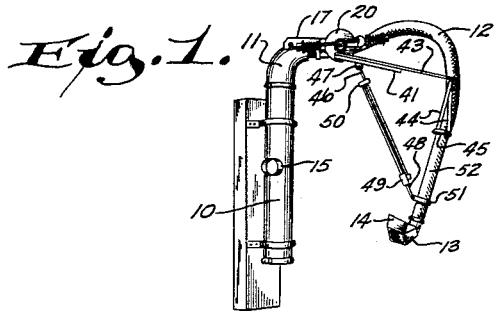
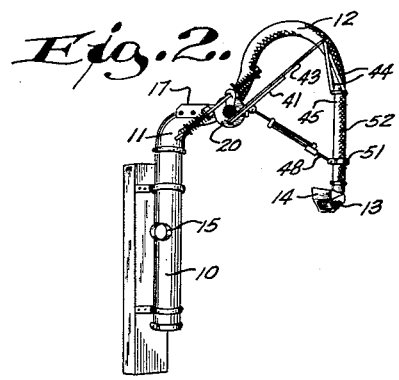
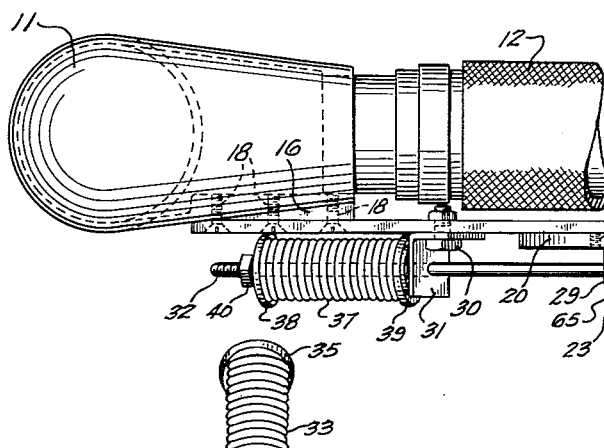
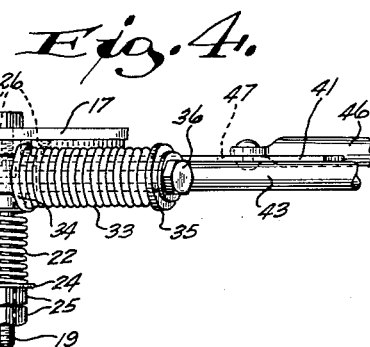
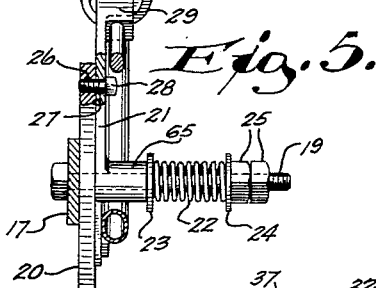
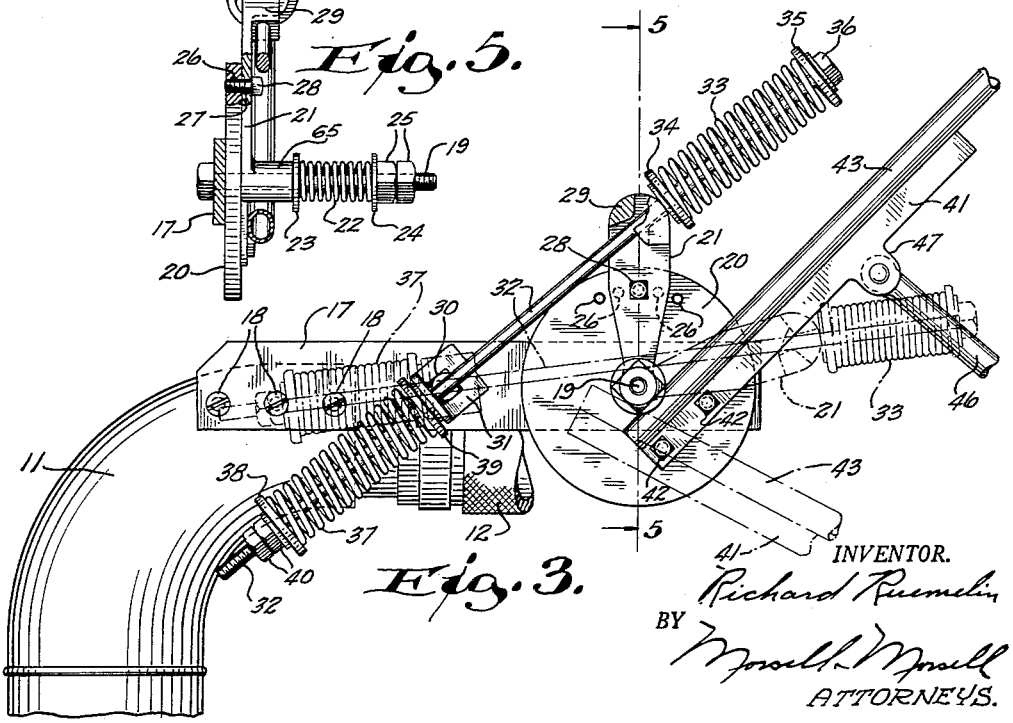
INVENTOR.
Richard Ruemelin
BY
Morsell & Morsell
ATTORNEYS.

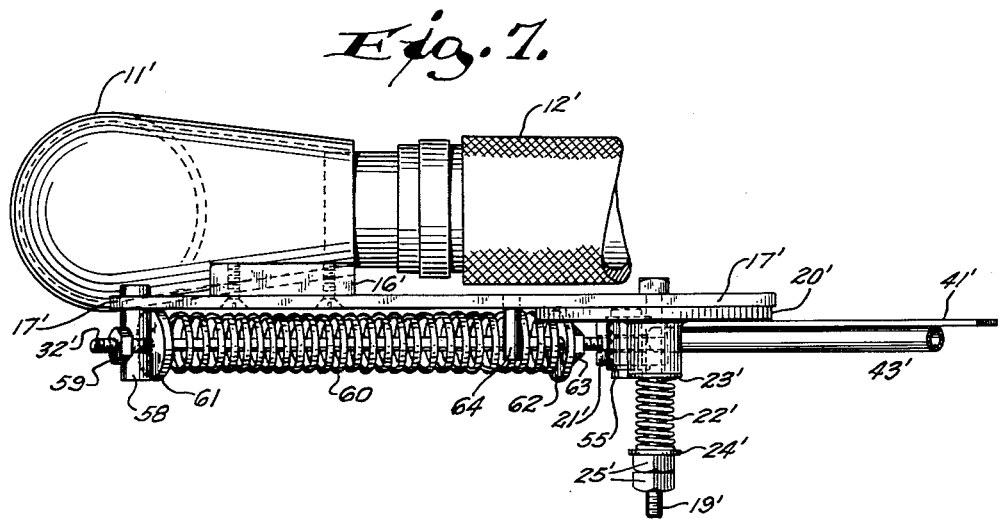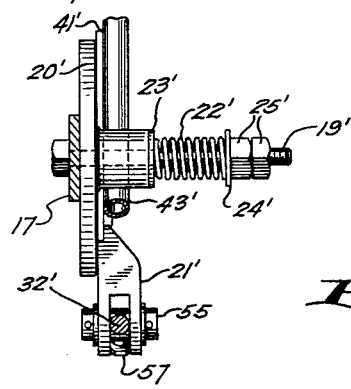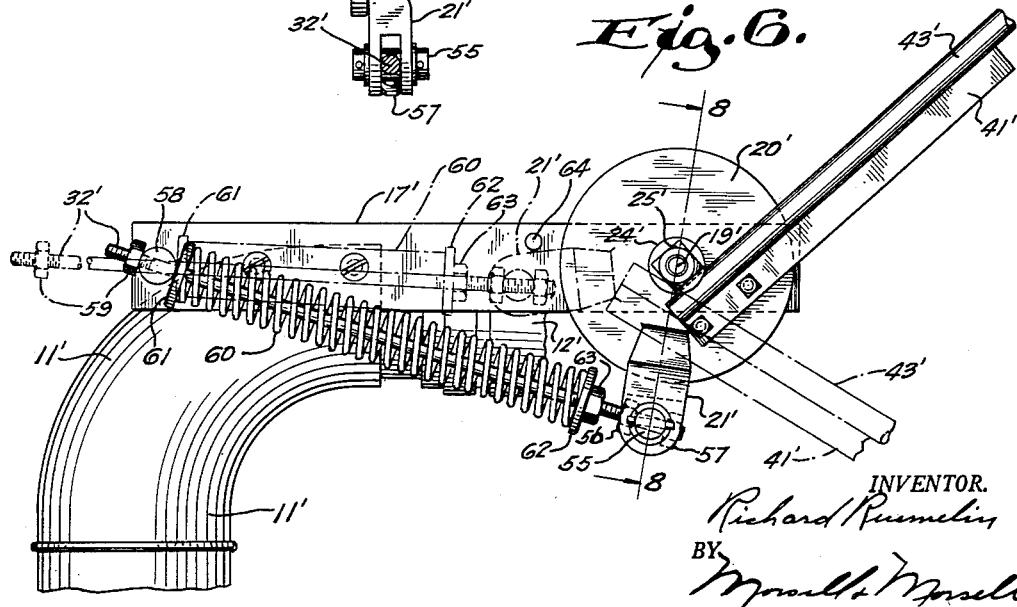

United States Patent Office 2,712,425
Patented July 5, 1955

2,712,425

HOSE SUPPORT FOR FUME AND DUST COLLECTORS

Richard Ruemelin, Milwaukee, Wis.

Application January 7, 1953, Serial No. 329,976

3 Claims. (Cl. 248—75)

This invention relates to improvements in fume and dust collectors.

My Reissue Patent Number 21,277 discloses a fume or dust collector having a flexible suction hose mounted for swinging movement on a horizontal as well as on a vertical axis. The free end or snout of the suction hose is held in a selected vertical position by adjustable hose supporting means including a projecting counterweighted arm which swings vertically and horizontally in response to movement of the hose.

It is a general object of the present invention to provide an improved fume and dust collector having a novel and improved form of adjustable hose supporting means providing a differential spring counterbalancing.

A further object of the invention is to provide an improved fume and dust collector of the class described in which the hose supporting means includes spring loaded linkage, which is so constructed that its lifting force acts directly on the hose and is automatically adjusted to compensate for changes in load which result from changes in the vertical position of the hose.

It is a further object of the invention to provide a device of the class described wherein the projecting counterweight is eliminated thus decreasing the amount of head room or clearance space required in a particular installation; eliminating the danger to an operator of being hit by the downwardly moving counterweight; and eliminating the inertia which results from a swinging counterweight as the snout of the hose is being adjusted vertically or horizontally.

A further object of the invention is to provide a fume and dust collector wherein the means for supporting the hose in various working positions includes an adjustable friction disc together with a variable spring-loaded leverage coacting with said disc.

A more specific object of the invention is to provide an improved fume and dust collector of the class described in which frictional resistance to horizontal swinging movement of the hose is reduced, and in which bending stresses on the swivel joint are also reduced. Thus manipulation of the suction hose is facilitated and the effective life of the swivel joint is increased.

Another specific object of the invention is to provide an improved fume and dust collector of the class described wherein there is a spring loaded hose supporting linkage and wherein the initial compressive stress on the springs is readily adjustable to suit requirements.

A further object of the invention is to provide an improved fume and dust collector which is strong and durable, simple in construction, inexpensive to manufacture and otherwise well adapted for the purposes described.

With the above and other objects in view, the invention consists of the improved fume and dust collector, and all of its parts and combinations, as set forth in the claims and all equivalents thereof.

In the drawing accompanying and forming a part of this specification, in which two forms of the invention are shown, and in which like characters of reference indicate the same parts in all of the views:

Fig. 1 is a side perspective view of the improved fume and dust collector with the parts thereof in operative position;

Fig. 2 is a view similar to Fig. 1 showing the parts in another position;

Fig. 3 is an enlarged fragmentary side view showing in full lines a portion of the hose supporting mechanism in approximately the same position as it is in Fig. 2, the approximate Fig. 1 position being shown in dot and dash lines;

Fig. 4 is a plan view of the portion of the improved fume and dust collector which is shown in Fig. 3;

Fig. 5 is a vertical sectional view taken along the line 5—5 of Fig. 3;

Fig. 6 is a view similar to Fig. 3 showing a modified form of the invention;

Fig. 7 is a plan view of the portion of the modified form of the invention which is shown in Fig. 6; and Fig. 8 is a vertical sectional view taken along the line 8—8 of Fig. 6.

Referring to Fig. 1 of the drawing, the improved fume and dust collector includes a dust trap 10 which may take the form of a cylindrical container and which may have a horizontally swingable connection with a head or elbow 11 at its upper end. An elongated flexible hose 12 is connected at one end to the elbow 11, and has a flared snout 13 at its other end, preferably provided with a damper or door 14. The dust trap 10 has a connection 15 which is adapted to be connected to a suitable source of suction, such as an exhaust blower (not shown).

The elbow 11 is formed on one side with a boss 16 to which one end of a horizontal bar 17 is fixed, as by screws 18. An elongated pivot bolt 19 is mounted in a suitable aperture in the projecting end portion of the bar 17, and a friction disc or rotatable support 20 is pivotally mounted on the bolt 19 for coaxial rotation thereon in frictional abutment with the bar 17. Also pivotally mounted on the bolt 19 is a lever or link 21 having a hub 65. A helical compression spring 22 surrounds said bolt and is located between retainers 23 and 24 outwardly of the hub 65. Nuts 25 which are threaded on the outer end of the bolt 19, abut the retainer 24 in a manner to place the spring 22 under a predetermined amount of compression to thereby urge the disc 20 against the bar 17.

The friction disc 20 may have a plurality of threaded holes 26 which are equally spaced from the bolt 19. The lever 21 has a hole 27 to receive a screw 28, the latter being threadable into a selected hole 26 to adjustably fix the lever 21 in a selected position of rotation relative to the disc 20. The lever 21 is formed at its outer end with a transversely projecting apertured lug 29 having a rounded outer surface, the aperture being large and flared at its ends.

A pivot bolt 30 is spaced inwardly on the bar 17 from the pivot bolt 19. An angle member 31, which has an apertured flange positioned flat against the bar 17, is pivotally mounted on the bolt 30. The other flange of the member 31 is apertured to slidably receive an elongated bolt 32 which bolt also slidably projects through the aperture of the lug 29 on link 21, the size of said lug aperture and its flared ends permitting angular movement of rod 32. A helical compression spring 33 surrounds the bolt 32 and is positioned between retainers 34 and 35, said spring and retainers being positioned between the lug 29 and head 36 of the bolt 32. A similar compression spring 37 surrounds the bolt 32 and is positioned between retainers 38 and 39, said latter spring and retainers being positioned between the angle member 31 and nuts 40, the latter being threaded on the end of the bolt 32 which is opposite the head 36. The nuts 40 are positioned on the bolt 32 in a manner to place the springs 33 and 37 under a predetermined amount of compression to thereby urge the link 21 and disc 20 in a counterclockwise direction, as viewed in Figs. 1 to 3.

A flat bar 41 is fixed to the outer face of the friction disc 20, as by screws 42, and an elongated hose supporting rod or tube 43 has an end portion fixed, as by welding, to the rod 43. The rod 43 carries a pair of supporting arms 44 at its outer end, the latter being connected to a band 45 which adjustably encircles the hose 12 as shown in Figs. 1 and 2. A rod 46 is pivotally connected at one end to the bar 41, as through an apertured lug 47 on the latter. The rod 46 is slidably connected to a parallel rod 48 by a friction joint 49 on the outer end of rod 46, there being a sliding loop 50 on the inner end of the rod 48. The outer end of the rod 48 is connected by a band 51 to a sleeve 52, the latter being connected to the hose 12 and pivotally supporting the snout 13. The rods 46 and 48 form a brace to connect the free end of the hose to the rod 43.

In operation of the improved fume and dust collector, the snout 13 can be moved to any desired position by grasping the sleeve 52 or the snout itself, and after movement the hose supporting linkage will hold the hose in the selected position. The disc 20 provides a suitable adjustable friction means for preventing movement of the linkage under the mere weight of the hose. The springs 33 and 37 urge the lever 21 and arms 43, 46 and 48 toward the position of Figs. 2 and 3 to counteract the force of gravity urging said parts in the opposite direction. The angularity of the rod 43 in its uppermost position can be varied by shifting the screw 28 to a different hole 26 in disc 20, thereby rotating the lever 21 relative to the disc 20 and changing the leverage relationship.

When the snout 13 and hose 12 are pulled downwardly to the operative position shown in Fig. 1, rod 43, disc 20 and lever 21 are rotated in a clockwise direction (Fig. 3) to the position shown in dot and dash lines in Fig. 3. This swings the bolt 32 downwardly toward the hub 65 of the lever 21 and further compresses the springs 33 and 37. The engagement of the bolt 32 with the hub 65 limits the downward travel of said bolt and of the rod 43. It will be noted that when the rod 43 is in its lowermost position the springs 33 and 37 are compressed the maximum amount, and hence exert their maximum force on the lever 21. However, because of the angularity of the lever 21 in this position, the increased exertion of force by the springs 33 and 37 does not exert a proportionately greater turning moment on said disc 20 and arm 43 in a counterclockwise direction. The range of movement of the bolt 32 is such that the lever 21 is at all times urged in a counterclockwise direction.

Since there is no heavy counterweight used in the improved fume and dust collector there is less resistance from inertia to movement of the hose and its supporting linkage. Less space is required since no allowances need be made for swinging of a counterweight arm. In addition, the elimination of a counterweight reduces the bonding stresses and friction between the elbow 11 and sand trap 10, thus making it easier to swing the hose horizontally.

Figs. 6 to 8 show a modified form of the invention utilizing a somewhat different spring loading mechanism in the hose suppoorting linkage. The parts of the modified form of fume and dust collector are otherwise similar to those of the principal form, and those parts of the modified form of the invention which are like parts of the principal form are indicated by the same numerals primed. Referring to Fig. 6, the disc 20' has a lever or arm 21' integral therewith and normally projecting downwardly. The end portion of the lever 21' is bifurcated and transversely apertured to receive a pivot pin 55. The pin 55 is diametrically apertured to receive an elongated bolt 32' which is fixed therein as by nuts 56 and 57, the latter being threaded onto said bolt on opposite sides of said pin.

A pivot pin 58 is suitably pivotally mounted on the left hand end of the bar 17' as viewed in Fig. 6, and is formed with a diametric aperture to slidably receive the opposite end of the bolt 32'. A nut 59 is threaded on the projecting end of the bolt 32'. A helical compression spring 60 surrounds the bolt 32' between retainers 61 and 62, said spring and retainers being positioned between the pivot pin 58 and a nut 63, the latter being threaded on the bolt 32' in a manner to place said spring under a predetermined amount of compression. A stop pin 64 is carried by the bar 17' in a position to be engaged by and limit the clockwise rotation of the lever 21'.

In operation of the modified form of the invention, the spring 60 urges the lever 21', and hence friction disc 20' and arm 43', in a counterclockwise direction at all times. As the arm 43' is pulled downwardly toward the dot and dash line position of Fig 6 the spring 60 is compressed. As in the principal form of the invention, the spring is compressed to its maximum when the hose is in its lowermost position. However, the increased force exerted by the spring 60 in its most compressed state does not exert a correspondingly increased rotational moment on the disc 20'. This is due to a differential in the leverage effect resulting from the angularity of the arm 21' in said dot and dash line position.

In both forms of the invention the initial compression of the springs is adjusted so that smooth operation results, and so that the minimum amount of friction is required between the friction disc and bar 17'. The spring loaded hose supporting linkages function to uniformly support the hose in any position within its range of movement, said linkage automatically compensating for the increased forces exerted by the springs when they are compressed during lowering movement of the hose.

Various changes and modifications may be made without departing from the spirit of the invention, and all of such changes are contemplated as may come within the scope of the claims.

What I claim is:

1. Counterbalancing means in combination with a device having a support and having an elongated member pivotally connected to said support and projecting therefrom comprising: a lever extending at an angle laterally with respect to said elongated member and pivotally movable therewith, an apertured abutment member pivotally mounted on said support, an elongated bolt having a slidable and pivotal connection with said lever and slidably extending through the aperture in said abutment member and having end portions projecting outwardly beyond said lever and abutment member; a first shoulder member on said bolt spaced outwardly from said apertured abutment member; a second shoulder member on said bolt spaced outwardly from said lever; a first compression spring coaxially surrounding said bolt and having its ends in engagement with said apertured abutment member and with said first shoulder member on the bolt; and a second compression spring coaxially surrounding said bolt and having its ends in engagement with said lever and with said second shoulder member on the bolt to urge said lever in a direction to raise said elongated member, when the elongated member is in raised position said lever extending at an angle to a line drawn between the axis of said pivotal connection between the elongated member and support and the pivot axis of said apertured abutment member, rotation of said lever in a direction to lower said elongated member deforming said springs and decreasing the angle between said lever and said line to decrease the effective moment arm of said lever as the deformation of said springs increases.

2. Counterbalancing means in combination with a device having a support and having a friction member rotatably connected to said support and having a lifting member connected to and projecting from said friction member comprising: a lever projecting from said friction member and normally pivotally movable therewith, said lever being at an angle of less than 180° with respect to said lifting member, an apertured abutment member on said support in a position spaced from said lever, an elongated bolt having a pivotal connection with said lever and slidable through the aperture of said abutment member, when the lifting member is raised said lever extending at an angle to a line drawn between the axis of the rotatable mounting for the friction member and the apertured abutment member on the support, means including a compression spring coaxially surrounding said bolt normally urging said lever in a direction to raise said lifting member, rotation of said lever in a direction to lower said lifting member deforming said spring and decreasing the angle between said lever and said line to decrease the effective moment arm of said lever as the deformation of said spring increases, and means for selectively connecting said lever in different positions on said friction member to vary the angularity of said lever with respect to said lifting member.

3. Counterbalancing means in combination with a device having a support and having a friction member rotatably connected to said support and having a lifting member connected to and projecting from said friction member comprising: a lever projecting from said friction member and normally pivotally movable therewith, said lever being at an angle of less than 180° with respect to said lifting member, an apertured abutment member mounted on said support in a position spaced from said lever, an elongated bolt having a pivotal and slidable connection with said lever and also slidable through the aperture in said abutment member on the support and having end portions projecting beyond said lever and abutment member, a shoulder on said bolt spaced outwardly from said apertured abutment member, a shoulder on said bolt spaced outwardly from said lever, a compression spring surrounding said bolt and located between said last mentioned shoulder and the lever, and another compression spring surrounding said bolt and located between the apertured abutment member and the first-mentioned shoulder on the bolt, said lever being normally urged by said springs in a direction to raise said lifting member.

References Cited in the file of this patent

UNITED STATES PATENTS

| | | |
|---|---|---|
| Re. 21,277 | Ruemelin | Nov. 21, 1939 |
| 624,001 | Armeads | May 2, 1899 |
| 703,742 | Salmond | July 1, 1902 |
| 769,868 | May | Sept. 13, 1904 |
| 2,090,136 | McKee | Aug. 17, 1937 |
| 2,200,518 | Perbal | May 14, 1940 |
| 2,299,251 | Perbal | Oct. 20, 1942 |
| 2,480,864 | Loepsinger | Sept. 6, 1949 |
| 2,547,532 | Mendelsohn | Apr. 3, 1951 |
| 2,615,708 | Rouverol | Oct. 28, 1952 |